US010359637B2

(12) United States Patent
Rossi

(10) Patent No.: US 10,359,637 B2
(45) Date of Patent: Jul. 23, 2019

(54) OPTICAL PATTERN PROJECTION

(71) Applicant: ams Sensors Singapore Pte. Ltd., Singapore (SG)

(72) Inventor: Markus Rossi, Jona (CH)

(73) Assignee: ams Sensors Singapore Pte. Ltd., Singapore (SG)

(*) Notice: Subject to any disclaimer, the term of this patent is extended or adjusted under 35 U.S.C. 154(b) by 0 days.

(21) Appl. No.: 15/528,239

(22) PCT Filed: Nov. 11, 2015

(86) PCT No.: PCT/SG2015/050444
§ 371 (c)(1),
(2) Date: May 19, 2017

(87) PCT Pub. No.: WO2016/080908
PCT Pub. Date: May 26, 2016

(65) Prior Publication Data
US 2017/0322424 A1 Nov. 9, 2017

Related U.S. Application Data

(60) Provisional application No. 62/082,929, filed on Nov. 21, 2014.

(51) Int. Cl.
*G02B 5/18* (2006.01)
*G02B 27/00* (2006.01)
(Continued)

(52) U.S. Cl.
CPC ............ *G02B 27/22* (2013.01); *G02B 5/1819* (2013.01); *G02B 27/0037* (2013.01);
(Continued)

(58) Field of Classification Search
CPC ...... G02B 5/18; G02B 5/1819; G02B 5/1842; G02B 27/22; G02B 27/0037;
(Continued)

(56) References Cited

U.S. PATENT DOCUMENTS 7,599,071 B2 10/2009 Dillon et al.
8,699,109 B2 4/2014 Kurashige et al.
(Continued)

FOREIGN PATENT DOCUMENTS

CN 203132512 U 8/2014
EP 1533646 5/2005

OTHER PUBLICATIONS

International Search Report and Written Opinion issued by ISA/AU for PCT/SG2015/050444 (dated Feb. 1, 2016).
(Continued)

*Primary Examiner* — Evan P Dzierzynski
*Assistant Examiner* — Mitchell T Oestreich
(74) *Attorney, Agent, or Firm* — Fish & Richardson P.C.

(57) ABSTRACT

This disclosure describes optical systems for projecting an irregular or complex pattern onto a region of space (e.g., a two-dimensional or three-dimensional object or scene). A respective light beam is emitted from each of a plurality of light sources. The emitted light beams collectively are diffracted in accordance with a plurality of different first grating parameters to produce a plurality of first diffracted light beams. The first diffracted light beams then collectively are diffracted in accordance with one or more second grating parameters.

16 Claims, 8 Drawing Sheets

(51) Int. Cl.
    *G02B 27/09*     (2006.01)
    *G02B 27/22*     (2018.01)
    *G02B 27/42*     (2006.01)
    *G02B 27/44*     (2006.01)
    *H04N 13/271*     (2018.01)

(52) U.S. Cl.
    CPC ....... *G02B 27/0944* (2013.01); *G02B 27/425* (2013.01); *G02B 27/44* (2013.01); *H04N 13/271* (2018.05)

(58) Field of Classification Search
    CPC .. G02B 27/0944; G02B 27/425; G02B 27/44; H04N 13/271
    USPC .......................................................... 359/569
    See application file for complete search history.

(56) References Cited

U.S. PATENT DOCUMENTS

| | | |
|---|---|---|
| 8,749,796 B2 | 6/2014 | Shpunt et al. |
| 8,834,997 B2 | 9/2014 | Stuesgen et al. |
| 2008/0225361 A1* | 9/2008 | Kasazumi .......... G02B 27/1053 359/15 |
| 2010/0284082 A1 | 11/2010 | Shpunt et al. |
| 2014/0140653 A1 | 5/2014 | Brown et al. |
| 2014/0211215 A1 | 7/2014 | Pesach et al. |

OTHER PUBLICATIONS

Intellectual Property Office of Taiwan, Search Report issued in Taiwan Application No. 104138308, dated Jan. 19, 2019, 1 page.

* cited by examiner

OPTICAL PATTERN PROJECTION

TECHNICAL FIELD

The present disclosure relates to optical pattern projection.

BACKGROUND

Optical pattern projection can be used in a variety of applications such as three-dimensional (3D) or depth mapping, area illumination, and LCD backlighting. 3D (or depth) mapping, for example, refers to a set of 3D coordinates representing the surface of an object. As part of the process of depth mapping, light (i.e., visible, infra-red, or other radiation) can be projected onto a region with a pattern of high quality (e.g., good resolution) and well-controlled intensity, so that depth values can be found reliably over a substantial part of an object or objects in a scene.

In some applications, diffraction gratings are used in creating a desired projection pattern. A diffraction grating can be implemented, for example, as an optical surface that is etched, molded or deposited on the surface of a substrate. In some systems, first and second diffraction gratings are arranged in series to diffract an input optical beam.

SUMMARY

This disclosure describes optical systems for projecting an irregular or complex pattern onto a region of space (e.g., a two-dimensional or three-dimensional object or scene). Such patterns can be used, for example, to provide enhanced textural contrast so as to facilitate stereo matching and/or depth calculations via added/adding scene/object texture, pattern distortion, triangulation and/or other depth imaging or sensing applications.

For example, in one aspect, a method of projecting an optical pattern onto an object or scene includes emitting a respective light beam from each of a plurality of light sources. The emitted light beams collectively are diffracted in accordance with different first grating parameters (e.g., profile functions and grating periods) to produce first diffracted light beams. The first diffracted light beams then collectively are diffracted in accordance with one or more second grating parameters (e.g., profile functions and grating periods).

In accordance with another aspect, an optical projection sub-assembly includes optical channels, light sources each of which is operable to emit light into a respective one of the channels, one or more first gratings that collectively provide a plurality of different first grating parameters, and one or more second gratings that collectively provide at least one second grating parameter. The one or more first gratings are arranged so that light emitted by the light sources is diffracted according to different ones of the first grating parameters to produce a plurality of first diffracted optical signals. The one or more second gratings are arranged to diffract the first diffracted optical signals.

In some implementations, various features of the gratings, such as the fan-out angles of the first and second gratings, can be selected to produce a highly irregular or complex light pattern that is projected onto a region of space.

Other aspects, features and advantages will be apparent from the following detailed description, the accompanying drawings and the claims.

DETAILED DESCRIPTION

Figure 1:
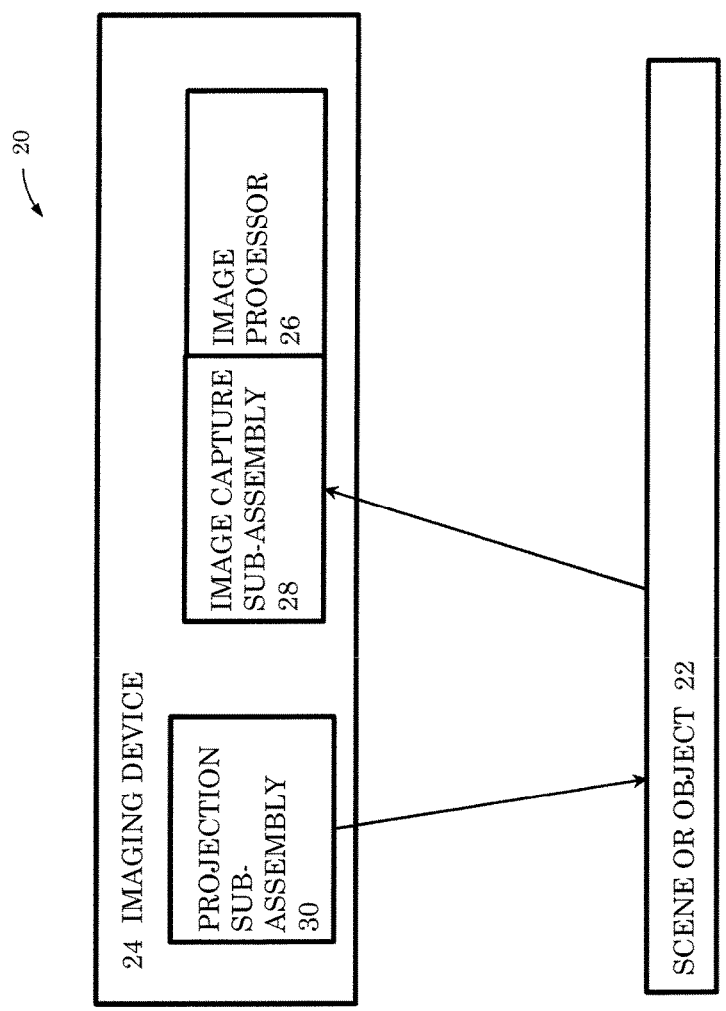
FIG. 1 is a block diagram of an optical 3D mapping system.

As illustrated in FIG. 1, an optical 3D mapping system 20 includes an imaging device 24 that has an optical projection sub-assembly 30 operable to generate and project an optical pattern onto a region 22 (e.g., a scene or object). The device 24 includes an image capture sub-assembly 28 operable to capture an image of the pattern appearing on the region 22. An image processor 26 is operable to process image data generated by the device 24 to obtain a 3D map of the region 22. In some cases, the image processor 26 computes the 3D map using triangulation-based 3D mapping. The image processor 26 can be implemented, for example, as a computer processor programmed in software to carry out the 3D mapping, or may be implemented in dedicated hardware, such as an integrated circuit. The image processor 26 may be separate from the imaging device 24 or may be implemented by dedicated circuitry within a housing of the imaging device 24 or otherwise associated with the imaging device.

Figure 2:
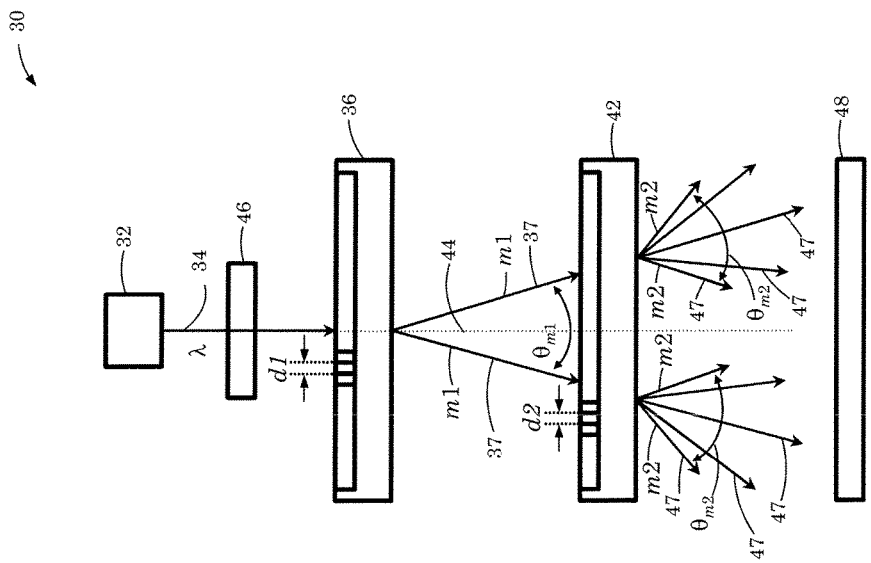
FIG. 2 illustrates an example of an optical projection sub-assembly.

FIG. 2 illustrates an example of the optical projection sub-assembly 30. As shown in FIG. 2, the optical projection sub-assembly 30 includes a light source 32, such as a laser diode or vertical cavity surface emitting laser (VCSEL), operable to generate and emit a light beam 34. In some instances, the light beam 34 has a narrow spectral emission (centered about a wavelength $\lambda$, e.g., 0.850, 0.905, and/or 0.940 μm). The light beam 34 passes through the optical assembly 46, which can include one or more beam shaping elements such as collimating lenses. The optical projection sub-assembly 30 further includes first and second gratings 36, 42. Each diffraction grating 36, 42 can be implemented, for example, as a diffraction grating and/or diffractive optical element defined by grating parameters such as a profile function and grating period. In the illustrated example, the first grating 36 has a period d1, whereas the second grating 42 has a period d2, which may differ from d1.

Each diffraction grating 36, 42 diffracts the light beam(s) incident on the particular grating. The angle of the light diffracted from a particular grating is defined by the angle of the incident light with respect to an axis 44 that is normal to the surface of the grating, the wavelength of the incident light, the characteristics of the grating (e.g., the grating period), and the diffraction grating equation. In general, the diffraction equation can be represented as follows:

$$d = \frac{m\lambda}{(\sin\alpha + \sin\beta)},$$

where d is the grating period of the grating, m is the diffraction order, $\lambda$ is the wavelength of the light, $\alpha$ is the angle of the incident light relative to the axis 44 normal to the surface of the grating, and β is the angle of the diffracted light relative to the axis 44 normal to the surface of the grating. In general, there may be multiple orders of diffracted light (e.g., m=−2, −1, 0, +1, +2). In some cases, however, depending on the grating parameters, (i.e. the profile function) some orders can be suppressed. For example, blazed gratings can be optimized for a particular wavelength of light and can be designed to suppress specified diffraction orders (e.g., m=0).

In the illustrated example of FIG. 2, the first grating 36 diffracts the incident light beam 34 into a plurality of first diffracted optical signals 37. In this example, the plurality of first diffracted optical signals 37 are diffracted as orders m=±1, which represent the highest magnitude diffraction orders diffracted from the first grating 36, in this example. Further they are labeled in FIG. 2 as m1 to indicate they are the highest magnitude diffraction orders diffracted from the first grating 36. First diffracted optical signals 37 are incident on the second grating 42 and each is diffracted into five diffraction orders, m=0, ±1, ±2, in this example, where each light beam diffracted from second grating 42 is labeled 47. The highest diffraction orders diffracted from the second grating 42 are labeled as m2 to indicate that they are the highest magnitude diffraction orders diffracted from the second grating 42, and they correspond to m=±2 in this example. In other implementations, each of the diffraction gratings 36, 42 may diffract each incident beam into a set of diffraction orders different from those of FIG. 2.

An angle between diffraction orders of the same magnitude |m| of a particular grating (e.g., the angle between beams m1, and/or the angles between beams m2) is herein termed a fan-out angle. While the diffracted angle of a particular diffraction order of a particular grating is dependent on the angle of light incident on the grating (i.e., according to the diffraction grating equation), the fan-out angle is independent of the angle of light incident on the grating. Consequently, the fan-out angles associated with each grating are independent of the angle of light incident on the grating. Moreover, the sum of 1) the fan-out angle of the highest diffraction order of the first grating (herein termed the first fan-out angle) and 2) the fan-out angle of the highest diffraction order of the second grating (herein termed the second fan-out angle) is the full-fan-out angle of the module. As shown in the example depicted in FIG. 2, a first fan-out angle is labeled as $\theta_{m1}$, and a second fan-out angle is labeled as $\theta_{m2}$. The sum of $\theta_{m1}$ and $\theta_{m2}$ is the full fan-out angle $\theta_{full}$ for the module, again where both $\theta_{m1}$ and $\theta_{m2}$ are associated with the highest diffraction orders of their respective diffraction gratings 36, 42. The full-fan-out angle may be any of a range of angles depending on the application of the module, for example, the full-fan-out angle $\theta_{full}$ may be from 10° to 100° or even more (e.g., may even be up to 160°). The first and second fan-out angles of the first and second gratings 36, 42 of the illustrative example of FIG. 2 may be calculated according to the following:

$$\theta_{m1} = 2 \times \sin^{-1} m1\lambda/d1$$

$$\theta_{m2} = 2 \times \sin^{-1} m2\lambda/d2,$$

where all variables have been defined above. Further the full fan out angle may be calculated according to the following:

$$\theta_{full} = \theta_{m1} + \theta_{m2}$$

where all variables are defined as indicated above.

As shown in FIG. 2, the light beams 47 exiting the second grating 42 can be projected onto an object 48 (e.g., a scene or object). By choosing the characteristics of the diffraction gratings 36, 42, a specified, pre-determined pattern can be projected onto the object 48 with a predetermined full-fan-out angle $\theta_{full}$. For example, a projector module with a light source 32 that emits light of 0.940 μm wavelength, a first fan-out angle $\theta_{m1}$ of 30°, a second fan-out angle $\theta_{m2}$ of 25° (where a full-fan-out angle of 55° is desired, for example), highest magnitude of diffraction orders of the first grating 36 is |1|, highest diffraction orders of the second grating 42 is |2|, the grating period d1 may be 3.63 μm and the grating period d2 may be 8.69 μm.

In some cases, instead of placing the optical assembly 46 between the light source 32 and the first grating 36, it can be located between the second grating 42 and the object 48. Alternatively, an optical assembly 46 may be positioned between the light source 32 and the first grating 36 and an additional optical assembly 46 may be positioned between the second grating 42 and the object 48.

Figure 3:
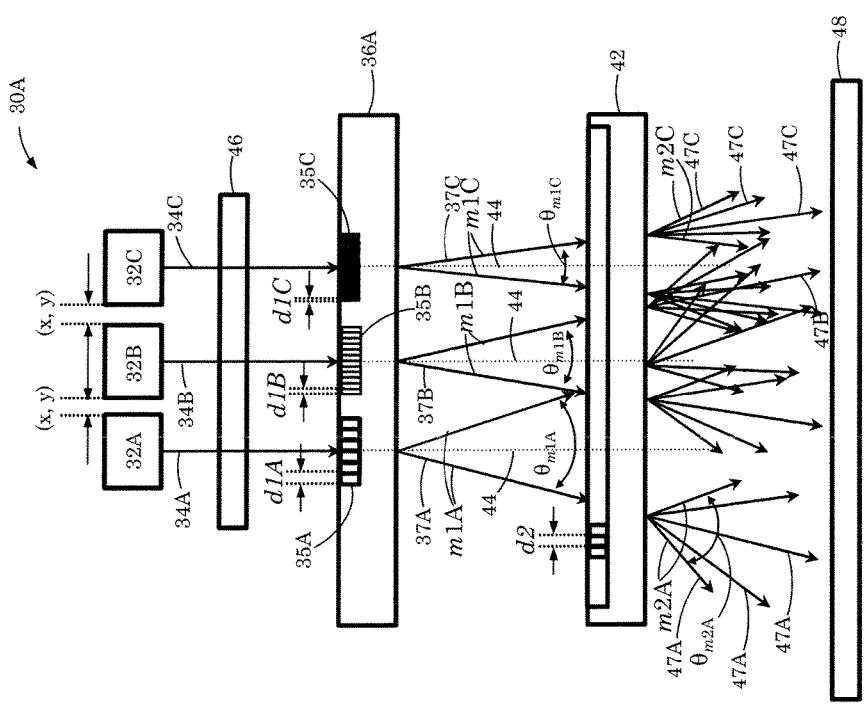
FIG. 3 illustrates another example of an optical projection sub-assembly.

A projection sub-assembly that includes multiple optical channels, each of which has a grating period that differs from the grating period of other channels, may be provided to increase or enhance the irregularity of the projected pattern. An example is illustrated in FIG. 3, which shows an optical projection sub-assembly 30A that includes three optical channels. In this case, there are three light sources 32A, 32B, 32C, each of which emits a respective light beam 34A, 34B, and 34C onto respective first regions 35A, 35B, and 35C of the first grating 36A. In some implementations the light sources 32A, 32B, and 32C may emit the same wavelength, however in other implementations a single, some, or all light sources may emit different wavelengths from each other. In particular, the first grating 36A includes various first regions 35A, 35B, 35C, each of which has a respective grating period (i.e., d1A, d1B, d1C, respectively).

Each incident light beam 34A, 34B, 34C is diffracted into multiple first diffracted optical signals 37A, 37B, 37C of multiple diffraction orders (e.g., m=±1), where say m=|1| is the maximum magnitude of diffraction orders associated with first regions 35A, 35B, and 35C (denoted as m1A, m1B, m1C, respectively, in FIG. 3). Further, the respective first fan-out angles ($\theta_{m1A}$, $\theta_{m1B}$, $\theta_{m1C}$) for the diffracted beams depend, in part, on the respective grating periods. Thus, in general, when the grating periods d1A, d1B, d1C are non-equal, then the first fan-out angles $\theta_{m1A}$, $\theta_{m1B}$, $\theta_{m1C}$ will differ from each other; accordingly, the optical output from the first grating 36A is irregular. For example, in the illustrative example depicted in FIG. 3, light beam 34A, 34B, and 34C may have a wavelength of 0.940 μm and may be collimated via optical assembly 46. First regions 35A, 35B, and 35C may comprise grating periods of d1A=3.56 μm, d1B=3.60 μm, and d1C=3.63 μm, respectively. Consequently, when collimated beams of light are incident on first regions 35A, 35B, and 35C, the beams of light diffract, where the highest magnitude diffraction orders (e.g., m1A, m1B, and m1C) emanating from each first region 35A, 35B, and 35C possess first fan-out angles $\theta_{m1A}$, $\theta_{m1B}$, and $\theta_{m1C}$ of 30.6°, 30.3° and 30.0°, respectively. As each of the first fan-out angles associated with each first region 35A, 35B, and 35C are different by a predetermined fan-out differential and are herein termed a first fan-out differential optical output from the first grating 36A is irregular. In this example the predetermined first fan-out differential is 0.3° for all first fan-out angles, however, in other implementations the first fan-out differential may be greater than or less than 0.3° (e.g., the first fan-out differential may be as large as 10°, or as small as 0.1°, or may be larger or smaller depending on intended application). Further the first fan-out differential may be non-equal with respect to different channels of the first grating 36A in order to provide greater irregularity in the optical output projected onto object 48. For example, in the illustrated example above, first fan-out angles $\theta_{m1A}$, $\theta_{m1B}$, and $\theta_{m1C}$ may be 30.9°, 30.3° and 30.0°, respectively.

First diffracted optical signals 37A, 37B, 37C from the first grating 36A then are incident on the second grating 42. Even if the second grating 42 has a single grating period (d2), the first diffracted optical signals 37A, 37B, 37C from the first grating 36A are incident on the second grating 42 at non-equal angles relative to axis 44. Thus, each of the first diffracted optical signals (e.g., 37A, 37B, and 37C) will be diffracted by the second grating at a different respective angle. In the illustrated example of FIG. 3, it is assumed that the second grating 42 diffracts the first diffracted optical signals 37A, 37B, 37C into five orders (i.e., m=±2, ±1, 0) each. However, the fan-out angles, for example the second fan-out angles $\theta_{m2A}$, $\theta_{m2B}$, $\theta_{m2C}$ (the angles between the highest magnitude diffraction orders m2A, m2B, and m2C, respectively, emanating from grating 42 in this example where m=|2|) are not dependent on the incident angles of first diffracted optical signals 37A, 37B, 37C. Accordingly, as second grating 42 has a single grating period (d2) in this example, the second fan-out angle associated with each channel (e.g., $\theta_{m2A}$, $\theta_{m2B}$, $\theta_{m2C}$) are the same. When d2 is 8.69 μm, for example, the second fan-out angle for each of $\theta_{m2A}$, $\theta_{m2B}$, $\theta_{m2C}$ is 25°. The full-fan out angle for each channel ($\theta_{fullA}$, $\theta_{fullB}$, $\theta_{fullC}$), however, are different in this example. For example, $\theta_{fullA}$=55.6°, $\theta_{fullB}$=55.3°, $\theta_{fullC}$ 55.0°, where $\theta_{fullA}=\theta_{m1A}+\theta_{m2A}$, etc. Accordingly, the light beams 47A, 47B, and 47C exiting the second grating 42 are incident onto an object 48 wherein the optical output is irregular. As noted above, in some cases, the optical assembly 46 may be placed between the second grating 42 and object 48.

In the example of FIG. 3, the first and second gratings may have a first N×M grating multiplicity (i.e., each incident light beam produces M×N diffracted beams), and a second R×S grating multiplicity (i.e., each incident light beam produces R×S diffracted beams). For example, the first grating 36A may have a first 2×2 grating multiplicity, meaning that a beam of light incident on first grating 36A is diffracted into two diffracted beams by a 1D grating (as illustrated in FIG. 3) and four diffracted beams by a 2D grating (e.g., +1, ±2). Similarly, second grating 42 may have a second 5×5 grating multiplicity, where a beam of light incident on the second grating 42 is diffracted into five diffracted beams by a 1D grating (as illustrated in FIG. 3) and twenty-five diffracted beams by a 2D grating (e.g., +2, +1, 0, +2, +1, etc.). Accordingly, in the example illustrated in FIG. 3 (as illustrated in 1D), each of the light beams 34A-34C from the three light sources 32A-32C results in ten diffracted beams exiting the second grating 42. The particular grating multiplicity, diffraction orders and/or the number of diffraction orders at each first and second grating 36A, 42 may differ from those illustrated by FIG. 3 depending on application and desired irregularity and/or complexity of the resulting optical output. For example, in cases where the fan-out angles (e.g., first fan-out angles) are non-equal, the overall complexity of the resulting irregular pattern incident on object 48 can be increased by increasing the first or second grating multiplicities (the number of beams diffracted from each grating). Moreover, in some instances, the number of optical channels may differ from that shown in FIG. 3 further increasing the complexity and/or irregularity of the resulting optical output incident on object 48.

Figure 4:
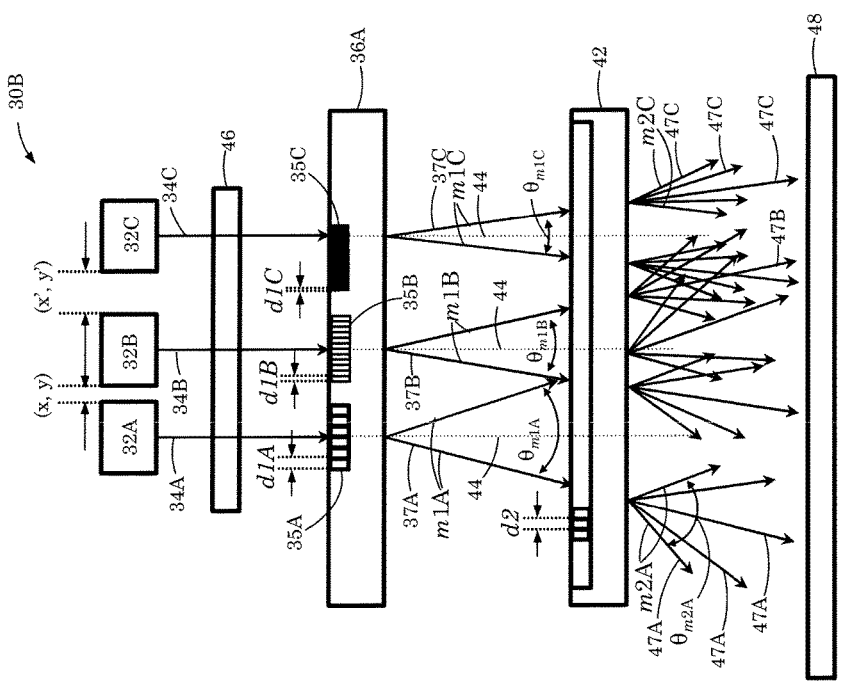
FIG. 4 illustrates a further example of an optical projection sub-assembly.

In the example of FIG. 3, the lateral spacing between adjacent light sources is substantially the same. In particular, the lateral spacing (x, y) between the light sources 32A and 32B is the same as the spacing between light sources 32B and 32C. In other implementations, however, the lateral spacing between adjacent pairs of sources may differ. For example, as shown in the optical projection sub-assembly 30B of FIG. 4, the lateral spacing between light sources 32A and 32B is (x, y), whereas the lateral spacing between light sources 32B and 32C is (x', y'). These differences in lateral spacing can help enhance the complexity and/or irregularity of the projected pattern.

Figure 5:
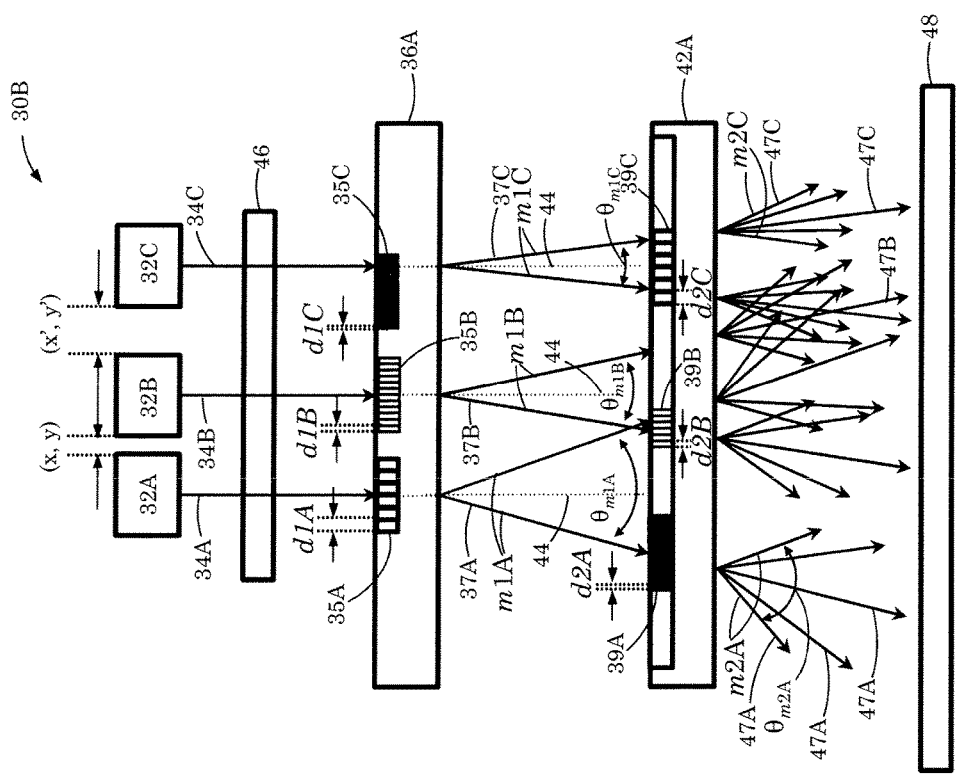
FIG. 5 illustrates yet another example of an optical projection sub-assembly.

In the foregoing examples, the second grating 42 is provided with a single grating period (d2). However, in some instances, as shown in FIG. 5, the second grating 42A also can have multiple second regions 39A, 39B, 39C, each of which has grating period (d2A, d2B, d2C) that differs from the grating periods of the other regions. Accordingly, each region may be associated with non-equal second fan-out angles (e.g., $\theta_{m2A}$, $\theta_{m2B}$, $\theta_{m2C}$) differing by a predetermined second fan-out differential, wherein the second fan-out differential may be equal or non-equal with respect to different channels of the second grating 42A. For example, in some implementations the second fan-out differential may be 1.0°, greater than or less than 1.0° (e.g., the second fan-out differential may be as large as 10°, or as small as 0.1°, or may be larger or smaller depending on intended application). Further the second fan-out differential may be non-equal with respect to different channels of the second grating 42A in order to provide greater irregularity in the optical output projected onto object 48.

In some cases, each first diffracted optical signal 37A, 37B, 37C diffracted from a particular first region 35A, 35B, 35C of the first grating 36A is incident on a second region 39A, 39B, 39C of the second grating 42 within the same optical channel. For example, the diffracted optical signal 37A may be incident on the first second-region 39A, the diffracted optical signal 37B may be incident on the second second-region 39B, and the diffracted optical signal 37C may be incident on the third second-region 39C. The grating periods (d2A, d2B, d2C) may be the same as, or different from, the corresponding gating periods (d1A, d1B, d1C) of the first grating 36A. Providing multiple regions having different respective grating periods in the second grating 42A can further increase the complexity of the optical pattern to be projected on an object 48 (i.e., object or objects within a scene).

Figure 6:
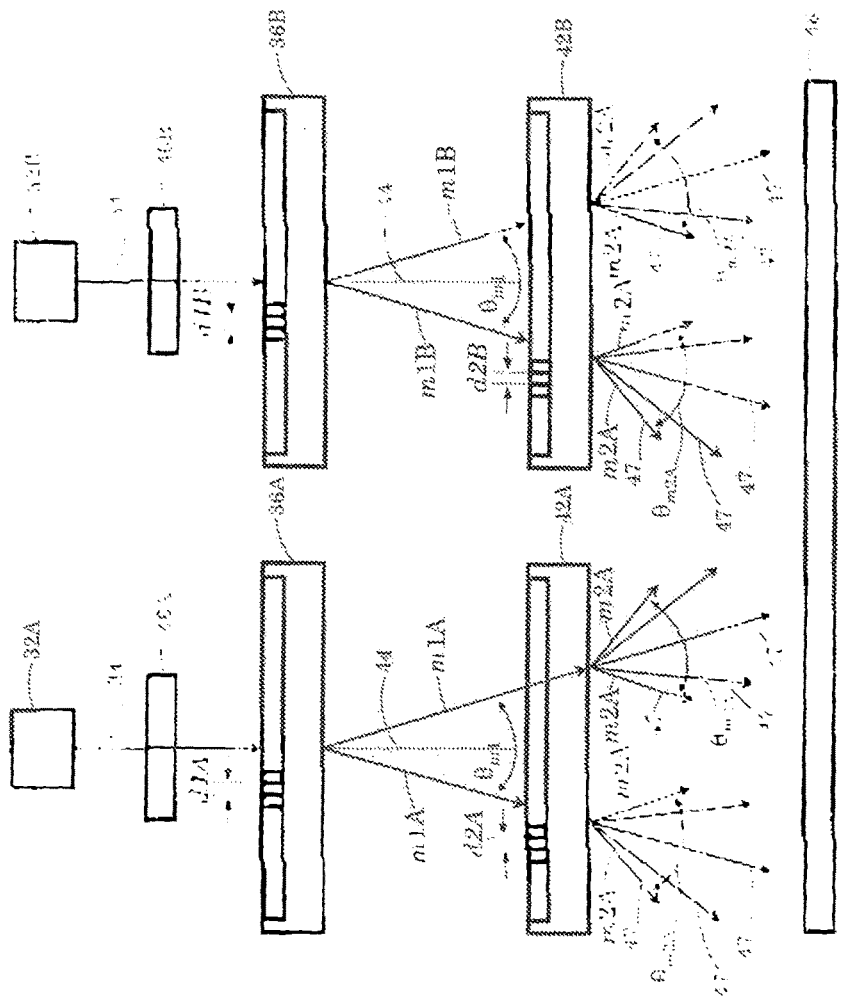
FIG. 6 illustrates an example of an optical projection sub-assembly.

As described above, in some implementations, a single first grating, second grating and optical assembly 46 can be provided for multiple optical channels (i.e., multiple emitters). In other implementations, each light emitter may have its own first grating, second grating and optical assembly. Thus, as shown in the example of FIG. 6, light from a first light source 32A is incident on an optical assembly 46A, and light from a second source 32B is incident on an optical assembly 46B. The light passing output from the optical assembly 46A is incident on the first gratings 36A, and the light passing output from the optical assembly 46B is incident on the first gratings 36B. The grating period (d1A, d1B) of the first gratings can differ from one another. Further, the light beams diffracted from a given one of the first gratings 36A, 36B, can be incident on a respective second grating. Thus, in the illustrated example, the light beams diffracted from the first grating 36A are incident on a second grating 42A having a grating period d2A. Likewise, the light beams diffracted from the first grating 36B are incident on a different second grating 42B having a grating period d2B. The grating periods d2A, d2B also may differ from one another and from the grating periods d1A, d1B of the first gratings 36A, 36B. As in other implementations, in some cases, the optical assemblies 46A, 46B may be disposed between the second gratings 42A, 42B and the object 48 (i.e., object or objects within a scene).

In some instances, it is desirable for each optical channel to be associated with an array of light emitters. Accordingly, as each first grating may be characterized by a first grating multiplicity (M×N) (i.e., each incident light beam produces M×N diffracted beams), and each second grating may be characterized by R×S diffraction (i.e., each incident light beam produces R×S diffracted beams). In such a system, the system produces M×N×R×S diffracted beams from a single emitter. An example is illustrated in FIG. 7, which shows five channels (A through E), and is described in greater detail in the following paragraphs.

Figure 7:
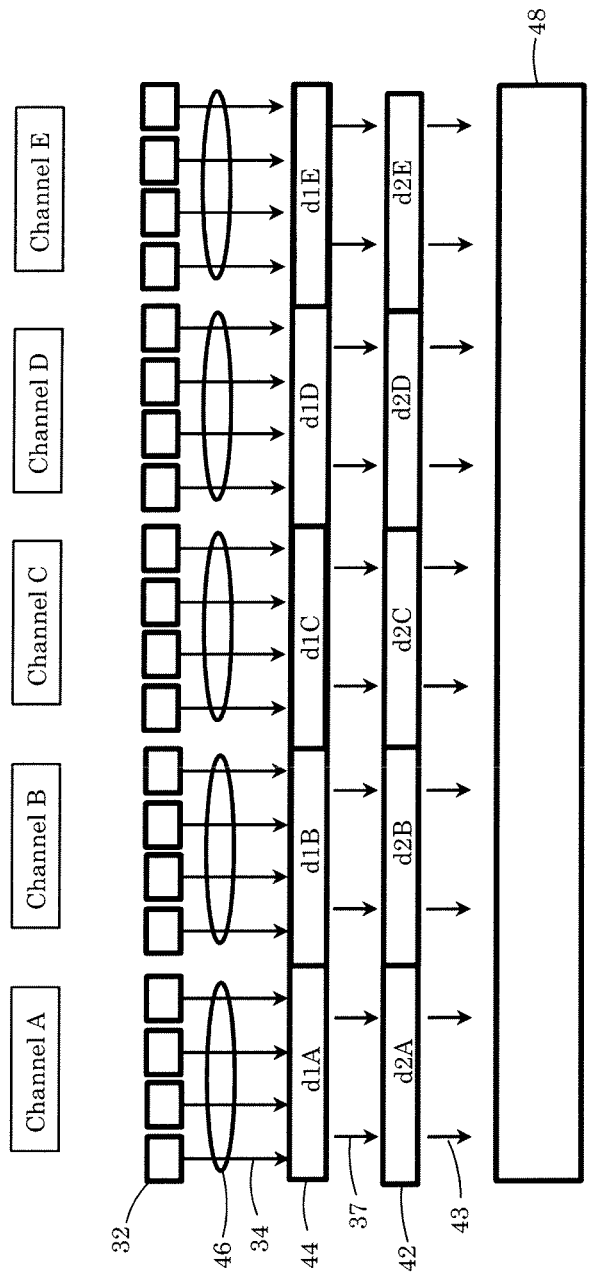
FIG. 7 illustrates another example of an optical projection sub-assembly.

In the projection sub-assembly of FIG. 7, each channel (A through E) includes a 2×2 array of light sources 32. Further, each channel includes a first grating 36 and a second grating 42. In the illustrated example, each first grating 36 is characterized by 2×2 diffraction such that each incident light beam 34 produces four first diffracted optical signals 37 (e.g., m=±1 in two dimensions). Also, each second grating 42 is characterized by 5×5 diffraction such that each first diffracted optical signal 37 produces twenty-five diffracted light beams 43 (e.g., m=0, ±1, ±2 in two dimensions). Each channel thus produces four hundred diffracted output beams for the projected pattern.

In the illustrated example of FIG. 7, each first grating 36 has a grating period (d1A, d1B, d1C, d1D, d1E) that differs from the other grating periods. In some cases, the grating periods (d2A through d2E) for the second gratings 42 are the same as one another, whereas in other cases, they may differ from one another. In a particular implementation, the grating periods d1A-d1E range from about 2.70-2.90 µm, whereas the grating periods d2A-d2E range from about 6.80-7.20 µm. Different values may be used for other implementations.

The projection sub-assembly of FIG. 7 also includes a respective optical assembly 46 for each channel. Here too, the optical assemblies 46 can be disposed between the second gratings 42 and the object 48, or between the light sources 32 and the first gratings 36. The diffracted beams from each channel can be projected as an irregular pattern onto an object or object 48. In other implementations, the number of channels and/or the diffraction characteristics of the first or second gratings may differ from the example of FIG. 7.

Figure 8:
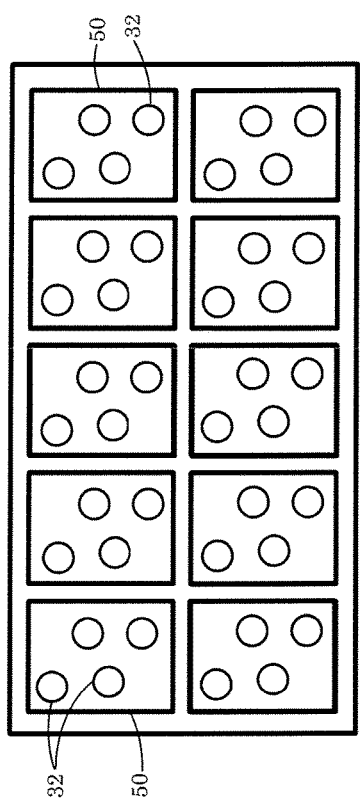
FIG. 8 is a plan view of an array of light emitters.

Although the projection sub-assembly of FIG. 7 is shown as 1×N array of channels (where N=5), the projection sub-assembly may, in some cases, include a two-dimensional M×N array of channels, where both M and N are equal to or greater than two. Further, the array of light sources 32 for each channel can be arranged in any of wide range of arrangements. FIG. 8 is a plan view showing an example of a 2×5 array of channels, each of which includes a 2×2 light source array 50 of light sources 32. Other variations are possible.

In the foregoing examples, each diffraction grating 36, 42 has grating parameters such as a grating profile function and a grating period. As described above, the grating periods of the first and/or second gratings can be varied to achieve a projected irregular optical pattern. In some implementations, instead of, or in addition to, varying the grating periods, other characteristics of the grating profile functions for the diffraction gratings 36, 42 can be varied to achieve specified diffracted light characteristics (e.g., diffraction orders and diffraction angles). Thus, in some cases, the grating profile function of each first grating 36 may differ from the grating profile function of the other first gratings. Depending on the implementation, the grating profile function of each second grating 42 may be the same as the grating profile functions of the other second gratings or may differ from the grating profile functions of the other second gratings. The grating profile function(s) of the second gratings 42 may be the same as or differ from the grating profile functions of the first gratings 36. Further, for a projection sub-assembly that includes a two-dimensional array of channels, the grating profile functions of the first or second gratings may differ from one another in only one lateral direction or may differ from one another in both lateral directions.

In some implementations, various features described in different ones of the foregoing examples can be combined. Further, various other modifications can be made within the spirit of the foregoing description. Thus, other implementations are within the scope of the claims.

What is claimed is:

1. An optical projection sub-assembly comprising:
   a plurality of optical channels;
   a plurality of light sources each of which is operable to emit light into a respective one of the channels;
   a first grating having a plurality of first regions each of which has a respective first grating period that differs from a corresponding first grating period of another one of the first regions; and
   a second grating having a plurality of second regions each of which has a respective second grating parameter that differs from a corresponding second grating parameter of another one of the second regions, wherein the second grating parameter is a grating profile function or a grating period,
   wherein the first grating is arranged so that light emitted by the light sources is diffracted by the first regions to produce a plurality of first diffracted optical signals, and
   wherein the second grating is arranged so that the second regions diffract the plurality of first diffracted optical signals.

2. The optical projection sub-assembly of claim 1 wherein each of the first regions has a respective grating profile function that differs from the grating profile function of another one of the first regions.

3. The optical projection sub-assembly of claim 1 wherein each of the second regions has a respective grating profile function that differs from the grating profile function of another one of the second regions.

4. An optical projection sub-assembly comprising:
   a plurality of optical channels;
   a plurality of light sources each of which is operable to emit light into a respective one of the channels;
   a first grating having a plurality of first regions each of which has a respective first grating parameter that differs from a corresponding first grating parameter of another one of the first regions, wherein the first grating parameter is a grating profile function or a grating period; and
   a second grating having a plurality of second regions, wherein each of the second regions has a respective grating period that differs from the grating period of another one of the second regions;

wherein the first grating is arranged so that light emitted by the light sources is diffracted by the first regions to produce a plurality of first diffracted optical signals, and wherein the second grating is arranged so that the second regions diffract the plurality of first diffracted optical signals.

5. The optical projection sub-assembly of claim 1 wherein the plurality of light sources includes first, second and third light sources aligned linearly in that order, wherein a lateral distance between the first and second light sources is the same as a lateral distance between the second and third light sources.

6. The optical projection sub-assembly of claim 1 wherein the plurality of light sources includes first, second and third light sources aligned linearly in that order, wherein a lateral distance between the first and second light sources differs from a lateral distance between the second and third light sources.

7. The optical projection sub-assembly of claim 1 further including an optical assembly disposed either between the plurality of light sources and the first grating, or disposed at a side of the second grating opposite a side at which the first grating is disposed.

8. The optical projection sub-assembly of claim 1 wherein each of the first grating and the second grating is a diffractive grating.

9. The optical projection sub-assembly of claim 1 wherein a full fan-out angle for light passing through a particular region of the first grating and a respective region of the second grating is in a range of 10°-100°.

10. The optical projection sub-assembly of claim 1 wherein each of the first regions defines a respective first fan-out angle for light of a particular wavelength, wherein the respective first fan-out angles differ from one another.

11. The optical projection sub-assembly of claim 10 wherein a fan-out differential between different ones of the first regions is in a range of 0.1°-10°.

12. The optical projection sub-assembly of claim 1 wherein each of the second regions defines a respective second fan-out angle for light of a particular wavelength, wherein the respective second fan-out angles differ from one another.

13. The optical projection sub-assembly of claim 12 wherein a fan-out differential between different ones of the second regions is in a range of 0.1°-10°.

14. A method of projecting an optical pattern onto an object or scene, the method comprising:
   emitting a respective light beam from each of a plurality of light sources;
   diffracting the emitted light beams to produce a plurality of first diffracted light beams, wherein the emitted light beams are diffracted using a first grating having a plurality of first regions each of which has a respective first grating period that differs from a corresponding first grating period of another one of the first regions; and
   diffracting the first diffracted light beams to produce second diffracted light beams, wherein the first diffracted light beams are diffracted by a second grating having a plurality of second regions each of which has a respective second grating period that differs from a corresponding second grating period of another one of the second regions.

15. The method of claim 14 including projecting an optical pattern corresponding to the second diffracted light beams onto an object or scene.

16. The method of claim 15 including passing the second diffracted light beams through one or more optical assemblies before projecting the optical pattern onto the object or scene.

* * * * *